(12) United States Patent
Yano et al.

(10) Patent No.: US 6,726,249 B2
(45) Date of Patent: Apr. 27, 2004

(54) MOTORIZED SEAT BELT RETRACTOR

(75) Inventors: Hideaki Yano, Tokyo (JP); Koji Tanaka, Tokyo (JP); Hiromasa Tanji, Tokyo (JP)

(73) Assignee: Takata Corporation, Tokyo (JP)

( * ) Notice: Subject to any disclaimer, the term of this patent is extended or adjusted under 35 U.S.C. 154(b) by 20 days.

(21) Appl. No.: 09/866,476

(22) Filed: May 29, 2001

(65) Prior Publication Data
US 2002/0024211 A1 Feb. 28, 2002

Related U.S. Application Data
(60) Provisional application No. 60/207,203, filed on May 26, 2000.

(51) Int. Cl.[7] .......................... B60R 22/28; B60R 22/46
(52) U.S. Cl. ...................... 280/805; 280/806; 280/807; 180/268; 242/390.9
(58) Field of Search ........................ 180/268; 280/805, 280/806, 807; 242/390.9, 390.8, 374, 379.1

(56) References Cited

U.S. PATENT DOCUMENTS

| | | | | |
|---|---|---|---|---|
| 3,918,545 A | * | 11/1975 | Andres et al. ............... 297/480 |
| 4,103,754 A | * | 8/1978 | Ashworth et al. .......... 180/268 |
| 4,478,433 A | * | 10/1984 | Taguchi et al. ............. 280/807 |
| 4,655,312 A | * | 4/1987 | Frantom et al. ............. 180/268 |
| 4,714,274 A | * | 12/1987 | Nagashima ............... 280/801.1 |
| 5,201,385 A | * | 4/1993 | Browne et al. .............. 180/268 |
| 5,552,986 A | * | 9/1996 | Omura et al. .................. 701/45 |
| 5,558,295 A | * | 9/1996 | Bauer ....................... 242/379.1 |
| 5,558,370 A | * | 9/1996 | Behr ........................... 280/806 |
| 5,744,872 A | * | 4/1998 | Cario et al. ................. 307/10.1 |
| 5,765,774 A | * | 6/1998 | Maekawa et al. ........ 242/390.9 |
| 5,772,144 A | * | 6/1998 | Tanabe et al. ............ 242/379.1 |
| 5,788,281 A | * | 8/1998 | Yanagi et al. ............... 280/806 |
| 5,924,641 A | * | 7/1999 | Keller et al. ............. 242/379.1 |
| 6,213,510 B1 | * | 4/2001 | Suyama ..................... 280/805 |
| 6,216,512 B1 | * | 4/2001 | Irie ................................ 72/121 |
| 6,290,159 B1 | * | 9/2001 | Specht et al. ............ 242/379.1 |
| 6,332,629 B1 | * | 12/2001 | Midorikawa et al. ....... 280/806 |
| 6,374,168 B1 | * | 4/2002 | Fujii ............................. 701/45 |
| 6,427,935 B1 | * | 8/2002 | Fujii et al. ................ 242/390.9 |

* cited by examiner

*Primary Examiner*—Ruth Ilan
(74) *Attorney, Agent, or Firm*—Foley & Lardner

(57) ABSTRACT

A motorized seat belt retractor configured to be activated in response to a signal generated by a dangerous state detection device indicating that a vehicle is in a dangerous state. The retractor is configured so that in response to the signal the retractor operates to retract a seat belt webbing prior to a collision thereby restraining an occupant positioned in a seat in the vehicle. The retractor is activated every time a signal indicating that the vehicle is in a dangerous state is received from the detector.

9 Claims, 10 Drawing Sheets

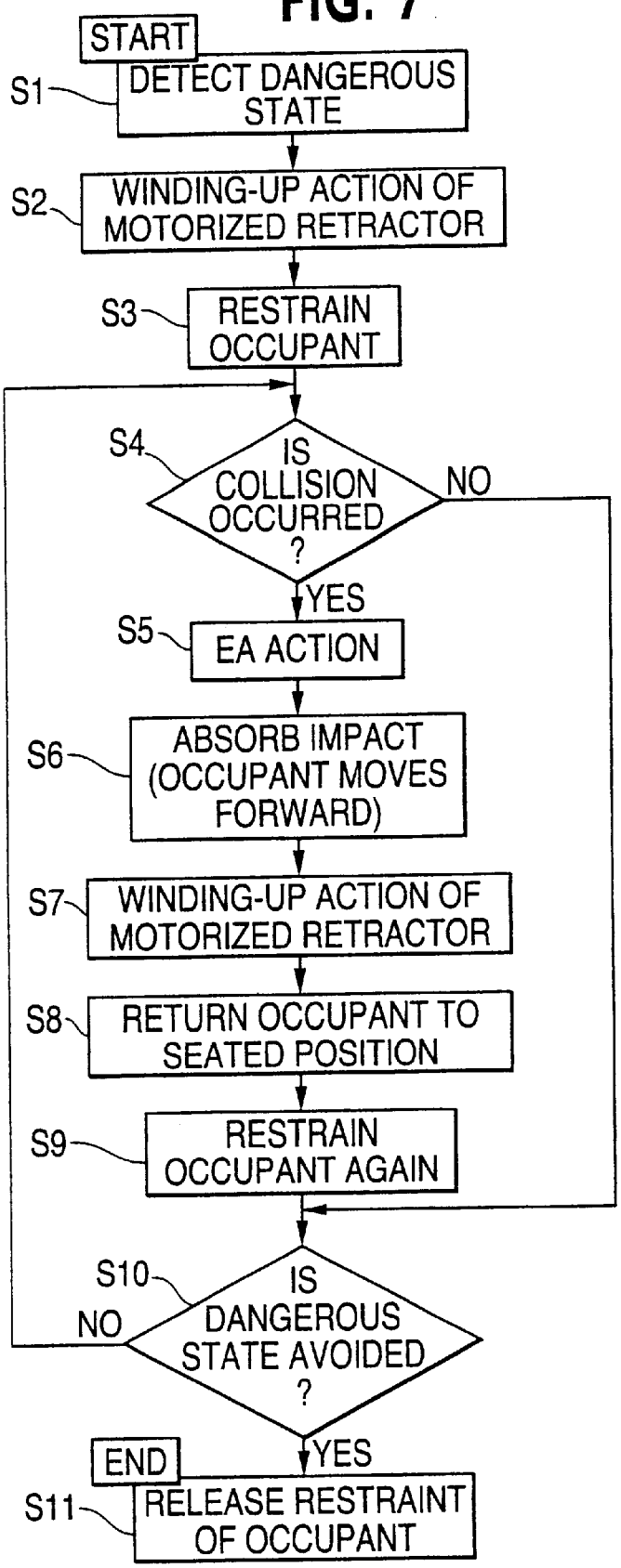

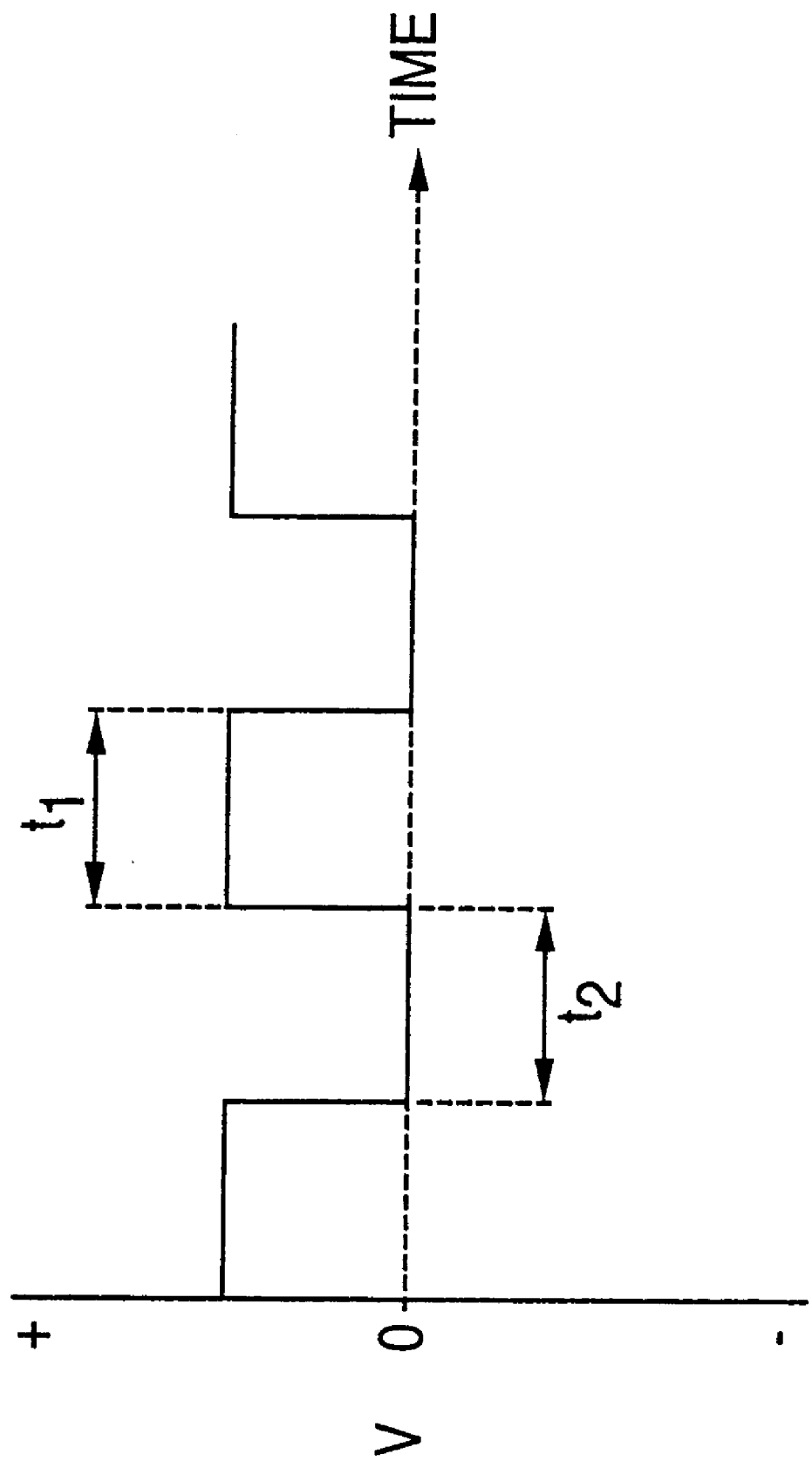

MOTORIZED SEAT BELT RETRACTOR

CROSS REFERENCE TO RELATED APPLICATIONS

The present application claims priority to and the benefit of U.S. Provisional Patent Application Ser. No. 60/207,203 filed May 26, 2000. The foregoing provisional application is incorporated by reference herein in its entirety.

BACKGROUND OF THE INVENTION

The present invention relates to a retractor with an Energy Absorbing ("EA") mechanism and a pretensioner mechanism. More particularly, the present invention relates to a seat belt retractor with a motorized pretensioner mechanism and a mechanical EA mechanism.

Conventionally, a seat belt retractor comprising a mechanical EA mechanism and a pyrotechnic pretensioner mechanism has been used.

It is desired to develop a seat belt retractor having an EA mechanism and a pretensioner mechanism, other than the form of such a mechanical EA mechanism and such a pyrotechnic pretensioner mechanism.

It is also desired to develop a seat belt retractor comprising a control system for coping with plural collisions by the use of a retractor of this kind.

SUMMARY OF THE INVENTION

According to the present invention a motorized seat belt retractor is provided. The retractor is configured to be activated in response to a signal generated by a dangerous state detection device indicating that a vehicle is in a dangerous state. The retractor is configured so that in response to the signal the retractor operates to retract a seat belt webbing prior to a collision thereby restraining an occupant positioned in a seat in the vehicle. The retractor is activated every time a signal indicating that the vehicle is in a dangerous state is received from the detector.

According to an alternative embodiment of the present invention, a system for protecting a passenger seated in a vehicle seat is provided. The system includes a sensing unit configured to provide a signal indicating that a collision is imminent and a control circuit operatively connected to the sensing unit. A seat belt device is also provided. The seat belt device includes a seat belt retractor. The retractor is configured to retract a webbing of a seat belt when a control signal from the control circuit is received. The retractor is adapted to maintain the webbing in a retracted state until the sensing unit determines that the collision is no longer imminent.

According to yet another embodiment of the present invention a method of protecting a passenger in a vehicle from a series of collisions is provided. The method includes detecting that the vehicle is in danger of being involved in a first collision and winding up a webbing of a seat belt to restrain the passenger. During the collision the method includes absorbing the impact on the passenger of the first collision by permitting the passenger to move forward and the webbing to withdraw. After the collision the method includes winding up the webbing to restrain the passenger and return the passenger to a normal seated position. The passenger is maintained in a restrained condition following the collision while a determination is made whether the vehicle is in danger of being involved in a second collision. When the second collision occurs the impact on the passenger is absorbed by permitting the passenger to move forward and the webbing to withdraw. The webbing is wound up to restrain the passenger and return the passenger to a normal seated position, The passenger continues to be restrained until there is no danger of further collisions.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below and which constitute part of this specification.

FIGS. 3(A) and 3(B) illustrating the operation of the embodiment of the present invention wherein FIG. 3(A) is a view illustrating a state where the motor is rotated in the clockwise direction (CW direction) and FIG. 3(B) is a view illustrating a state where the motor is rotated in the counterclockwise direction (CCW direction).

FIG. 7 is a flow chart of the control system.

FIG. 10 is a graph of the dc current/voltage applied to the retractor motor versus time.

DETAILED DESCRIPTION

Hereinafter, an embodiment of the present invention will now be described with reference to the drawings. It should be understood that the sizes, shapes, positional relation of respective components are schematically shown just for understanding the invention and that the numerical conditions stated in the following are just illustrative examples.

The present invention provides a motorized seat belt retractor comprising a winding-up means which receives a signal informing dangerous state from a dangerous state detecting means and winds up a webbing prior to a collision to restrain an occupant, and being characterized in that the winding-up means can be activated repeatedly every time receiving the signal informing dangerous state from the dangerous state detecting means.

Preferably, the dangerous state detecting means may include any of the following: a collision predictive device; an acceleration sensor; a vehicle behavior sensor; a seated state sensor; and a wheel slip sensor.

According to this structure, webbing-winding-up action can be made repeatedly every time the occupant and the vehicle are in dangerous state. Therefore, the occupant can be securely restrained in the event of another collision. Preferably the winding-up means releases the restraint of the occupant when the dangerous state is avoided. The restraint of the occupant can be cancelled immediately when the dangerous state is avoided because the restraint of the occupant is no longer needed. The winding-up means may release the restraint of the occupant when no signal informing dangerous state is outputted for a predetermined period of time.

It is possible to detect a state that the vehicle is in wheel slip or other condition indicating that a collision is imminent. Thus, the winding-up means can be activated prior to a collision, thereby further ensuring the initial restraint of the occupant. According to this structure, it is possible to securely restrain the occupant when the vehicle is at a steep acceleration or a steep deceleration. According to this structure, since it is possible to detect a state that the occupant is positioned out of the suitable seated position, the occupant can be restrained in the suitable seated position.

Figure 1:
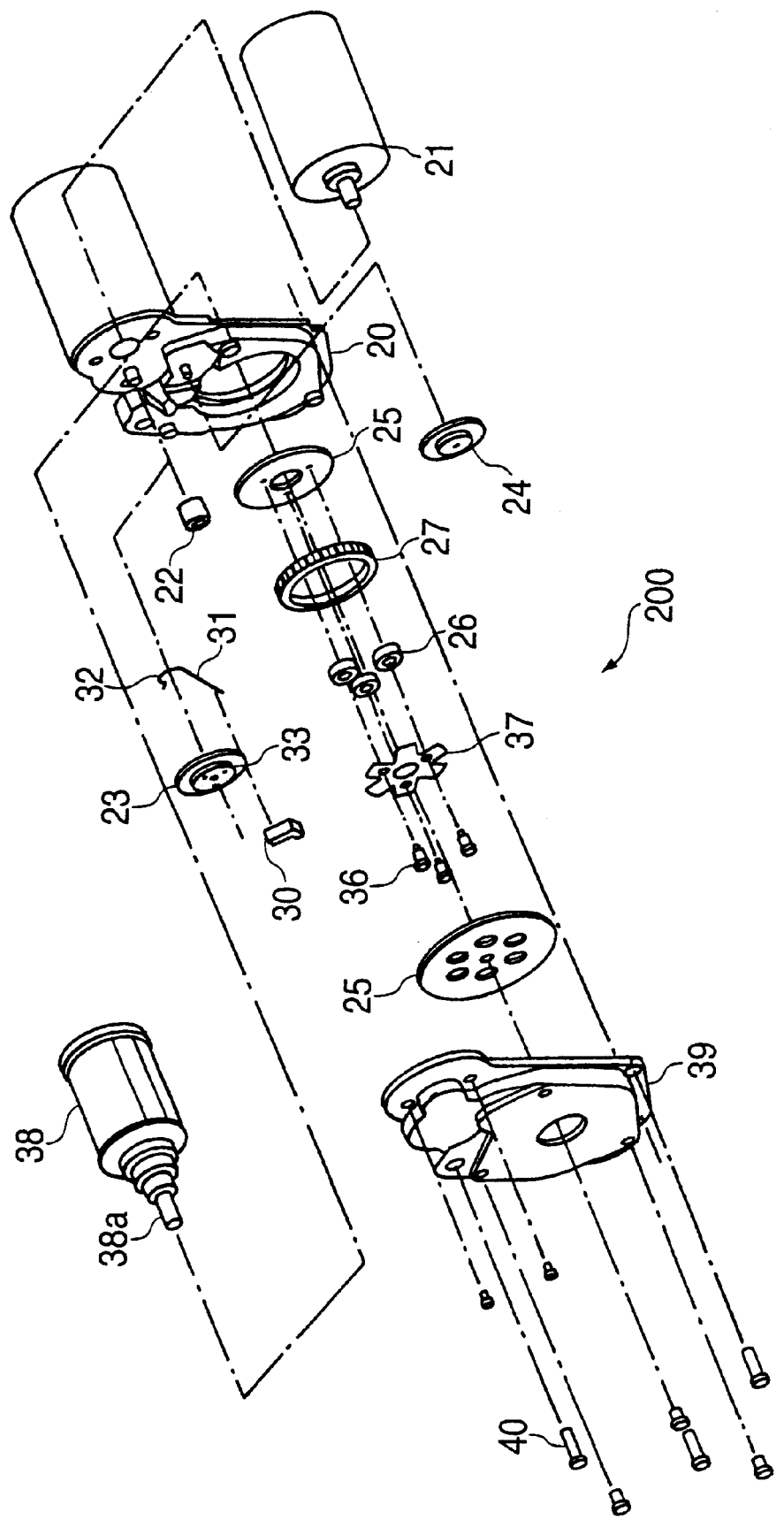
FIG. 1 is an exploded perspective view showing an embodiment of a retractor according to the present invention.
Figure 2:
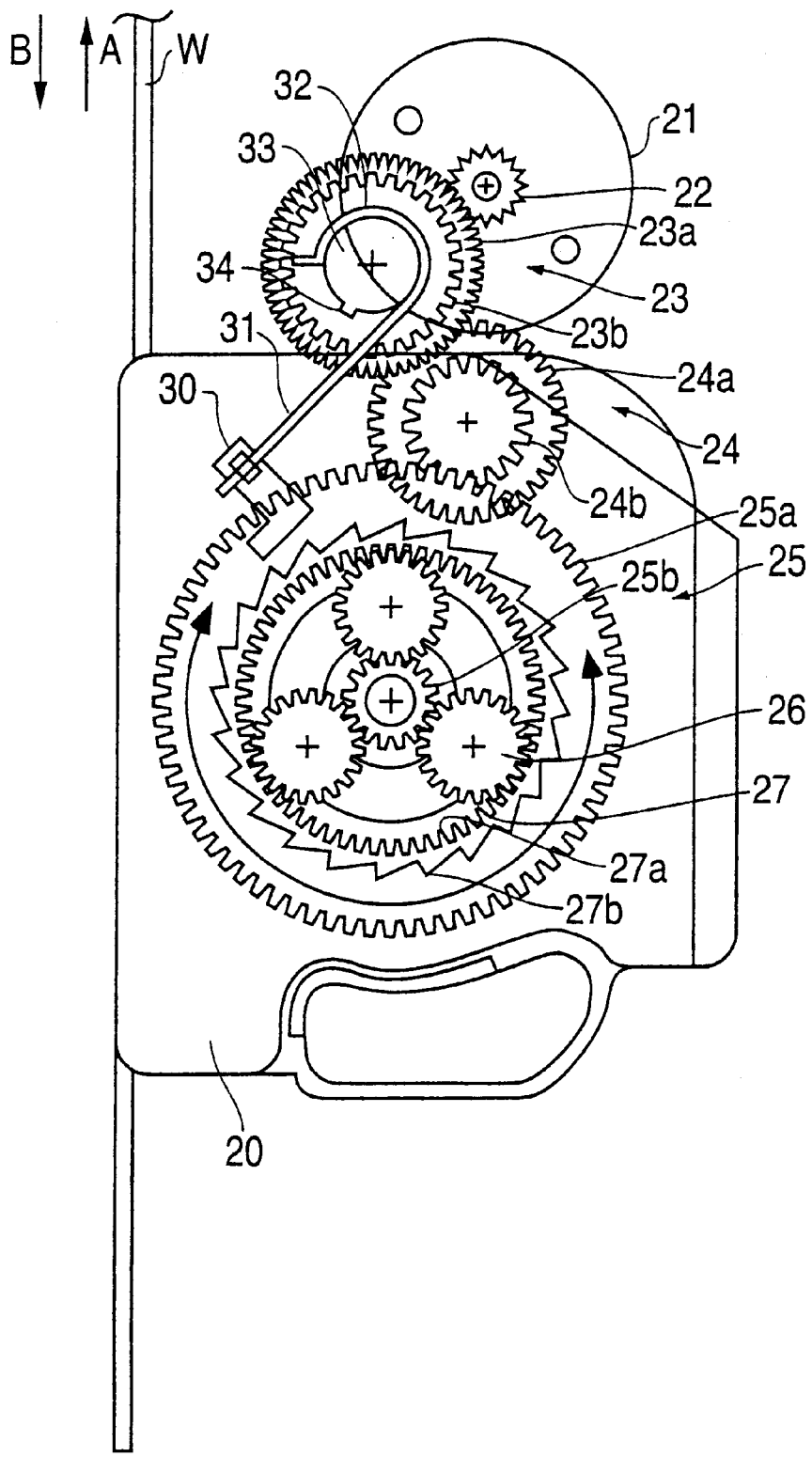
FIG. 2 is an explanatory view showing the mesh relation between gears of the retractor of the embodiment according to the present invention.

Hereinafter, description will now be made as regard to the structure and operation of the motorized retractor. FIG. 1 is an exploded perspective view showing the embodiment of the retractor according to the present invention. FIG. 2 is an explanatory view showing the mesh relation between gears of the retractor of this embodiment. It should be noted that the illustration of a pyrotechnic pretensioner mechanism is omitted in FIG. 1.

The structure of the retractor of this embodiment will now be described with reference to FIGS. 1, 2. The retractor 200 comprises the following components: a retainer 20; a DC motor 21 attached integrally to the retainer 20; a pinion 22 attached integrally to a motor shaft of the DC motor 21; a first gear 23 which is journal led by a projection formed on the retainer 20 and is in mesh or engaged with the pinion 22. The first gear 23 is preferably an integral double gear comprising a large gear 23a and a small gear 23b. The pinion 22 is positioned to mesh with the large gear 23a.

The retractor also includes a second gear 24 which is journal led by a projection formed on the retainer 20 and is in mesh or engaged with the first gear 23. In particular, the retainer is engaged with the small gear 23b. The second gear 24 is preferably an integral double gear comprising a large gear 24a and a small gear 24b. The small gear 23b is in mesh or engaged with the large gear 24a.

The retractor further includes a third gear 25 which is in mesh with the second gear 24. In particular, the third gear is engaged with the small gear 24b. The third gear 25 is preferably an integral double gear comprising a large gear 25a and a small gear 25b. The small gear 24b is in mesh with the large gear 25a.

The retractor also includes three planetary gears 26 which are in mesh with the third gear 25. The planetary gears engage the small gear 25b. An internal gear 27 is also provided. The internal gear 27 has internal teeth 27a which engage with the three planetary gears 26. The internal gear 27 includes external ratchet teeth 27b formed in the outer periphery of the internal gear 27.

A pawl 30 is provided to engage with the external ratchet teeth 27b, and to thereby stop the rotation of the internal gear 27 in the clockwise direction. The pawl 30 is supported at a lever 31 comprising a spring at an end connected to the pawl 30. The other end of the lever 31 includes a portion curled to form a ring member 32 that is formed in a curled portion of the other end of the lever 31. The ring member 32 is wound on a projecting disk-like member 33. The disk-like member 33 is integrally formed coaxially with the first gear 23. A frictional piece 34 projects from the outer periphery of the disk-like member 33 and presses against the ring member 32 to apply friction.

The three planetary gears 26 are positioned on a carrier 35. Three pins 36 are provided for rotatably supporting and securing the three planetary gears 26 to the carrier 35. A speed-reduction plate 37 is interposed between the three pins 36 and the three planetary gears 26.

Figure 3:
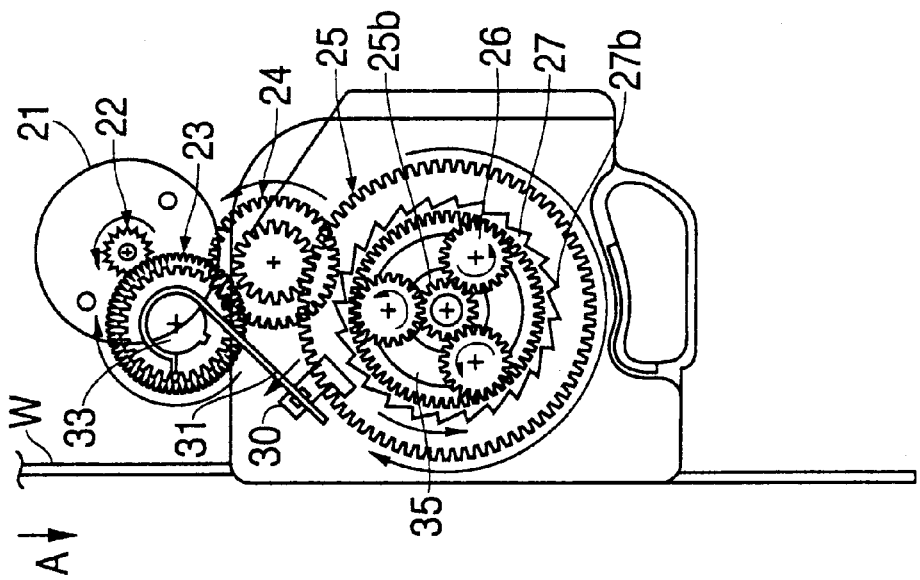

A webbing W for restraining an occupant's body of which one end is fixed to a spool 38. As shown in FIGS. 2 and 3 arrow A designates a direction of withdrawing the webbing W and arrow B designates a direction of retracting the webbing W. The spool 38 includes a tip portion 38a that passes through a rotational central hole of the carrier 35. The tip portion 38a also passes through the rotational central hole of the third gear so as to be both slidable and rotatable relative to the third gear. On the other hand, the root of the tip portion 38a is fitted and fixed to the carrier 35.

The retractor includes a cover 39 covering the entire of the force transfer mechanism or gear train. A plurality of screws 40 are provided for fixing the cover 39 to the retainer 20.

A control circuit controls the connection of the DC motor 21 to be short-circuited or non-short-circuited and also controls the rotation of the DC motor 21 in the clockwise (CW) direction or in the counterclockwise (CCW) direction.

As described herein, when the motor 21 is short circuited, no driving current is supplied to turn the motor shaft. In this condition, when the shaft of the motor attempts to rotate due to the rotational force transferred from the first gear and engaged pinion a counter electromotive force resists movement of the motor shaft.

As described herein, when the motor is non-short-circuited the motor may be located in an open-circuit or may be connected to a DC power source which supplies a driving current that generates a rotational force to drive the shaft in a chosen direction.

Hereinafter, description will now be made as regard to the operation of the retractor of the present invention with regard to the aforementioned components.

FIGS. 3(A) and 3(B) illustrating the operation of this embodiment wherein FIG. 3(A) is a view illustrating a state where the motor is rotated in the clockwise direction (CW direction) and FIG. 3(B) is a view illustrating a state where the motor is rotated in the counterclockwise direction (CCW direction).

In the retractor 200, as shown in FIG. 2 and FIG. 3(B), the engaging pawl 30 is spaced apart from the external ratchet teeth 27b so that the internal gear 27 is not restricted in the normal state (i.e., not in an emergency such as emergency braking or a vehicle collision). In this normal state, because of the property of the planetary gear train, the rotational torque of the carrier 35 is not transmitted to the third gear. Therefore, the rotational torque of the spool 38 integrally fitted and fixed to the carrier 35 is not transmitted to the rotational shaft of the DC motor 21, which is indirectly engaged with the third gear.

In the event of emergency, such as emergency braking and a vehicle collision, a pretensioner mechanism (for winding up the webbing W to increase the belt tension of the webbing W prior to the actuation of the pyrotechnic pretensioner mechanism) is actuated according to output signals from an ABS (anti-skid or brake) mechanism and/or a collision predictive device in order to rotate the rotational shaft of the DC motor 21 in the CW direction as shown by the arrow in FIG. 3(A). Then, the rotational torque of the pinion 22 in the clockwise direction is transmitted to the first gear 23 as a rotational torque in the counterclockwise direction (indicated by arrow). As a result, the pawl 30 engages with one of the external ratchet teeth 27b of the internal gear 27 to stop the rotation of the internal gear 27 in the clockwise direction (indicated by arrow). Therefore, the rotational torque of the third gear 25 can be transmitted to the carrier 35, which is integrally fitted and fixed to the spool 38.

In the case of the emergency condition, the rotational torque of the first gear 23 is transmitted to the second gear 24 as rotational torque in the clockwise direction (indicated by arrow). In addition, the torque is further transmitted to the third gear 25 as rotational torque in the counterclockwise direction (indicated by arrow). Due to the rotation of the third gear 25 in the counterclockwise direction, the small gear 25b of the third gear 25 is rotated in the counterclockwise direction so as to apply rotational torque in the clockwise direction (indicated by arrow) to the three planetary gears 26. The three planetary gears 26 rotate in the clockwise direction (indicated by arrow) like planets around the small gear 25b and, during this rotation, engage with the internal teeth 27a of the internal gear 27. The internal gear 27 is stopped from rotating by the pawl 30. Therefore, the carrier 35 rotates to journal the three planetary gears 26 in the counterclockwise direction (indicated by arrow). Because the spool 38 is fitted and fixed to the carrier 35, which is rotating in the counterclockwise direction, the spool also rotates in the counter clockwise direction to wind up the webbing W (in the direction of arrow B).

Thereby, as described above, the rotational torque generated by the shaft of the DC motor 21 rotating in the clockwise direction is transmitted to the spool 38 as rotational torque for winding up the webbing W.

As impact is exerted on a vehicle body due to a vehicle collision, impact detecting signals are outputted from an acceleration sensor (not shown) and/or a crash sensor (not shown) whereby a pyrotechnic pretension mechanism (not shown) is actuated to retract the webbing W into the retractor 200, as described above, thereby ensuring initial restraint of the occupant.

After the collision or impact occurs, the webbing W will be withdrawn (in a direction of arrow A in FIG. 3(A)) by the inertial force of the occupant moving forwardly due to the collision. During this movement of the webbing W and the spool 38, as shown in FIG. 3(A), the torque applied to the spool 38 by withdrawing of the webbing W is transmitted to the DC motor 21 as rotational torque in the counterclockwise direction (in a direction opposite to the direction of arrow) because the engaging pawl 30 is engaged with the external ratchet teeth 27b. When the DC motor is short-circuited (i.e., the terminals are connected, but no external voltage is applied), the movement of the DC motor shaft created by the occupant's motion is opposed by a counter electromotive force ("counter emf"). This rotational resistance force will be utilized for the locking mechanism and/or the EA mechanism. It should be noted that the term "EA" is an abbreviation of "energy absorbing" meaning that impact (load) acting on an occupant's body is absorbed, and this term will be used generally hereinafter.

The characteristics of the rotational resistance force will now be described with reference to the drawings.

Figure 4:
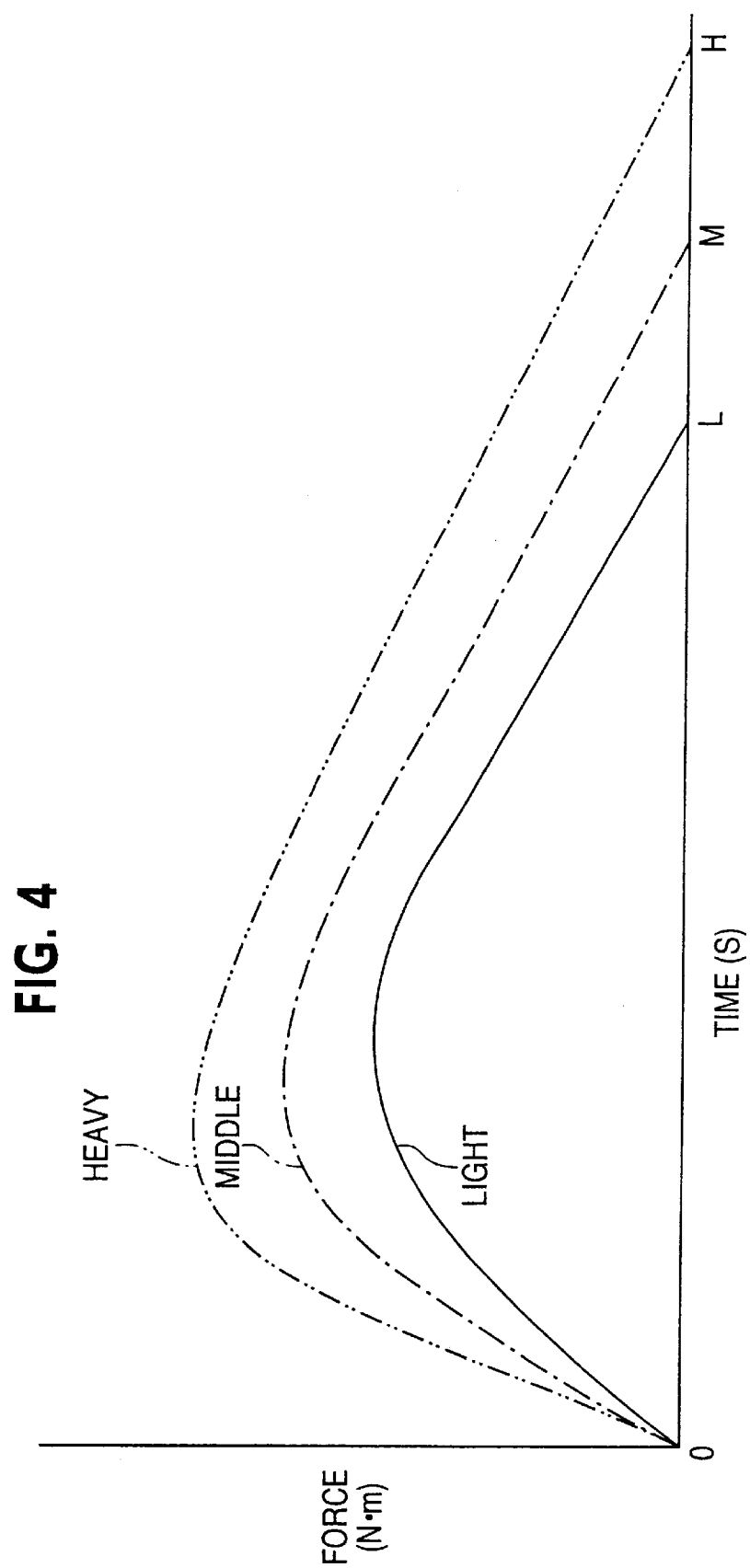
FIG. 4 is a graph schematically showing the relation between the rotational resistance force F [Nm] (Newton meter) of the short-circuited DC motor and time T [sec] (second) from a point where a vehicle collides with a wall (0 point in this figure) to a point where the vehicle completely crashes. Curves indicate cases which are different in the weight (Light, Middle, Heavy) of occupant in the vehicle, respectively.

The characteristics of the rotational resistance force will now be described with reference to the drawings. FIG. 4 is a graph schematically showing the relation between the rotational resistance force F [Nm] (Newton meter) provided by the short-circuited DC motor and time T [sec] (second) from a point where a vehicle collides with a wall (0 point of this graph) to a point where the vehicle completely crashes. The three curves shown in FIG. 4, indicate situations where different weight occupants were located in the vehicle (i.e., Light, Middle and Heavy occupants).

Figure 5:
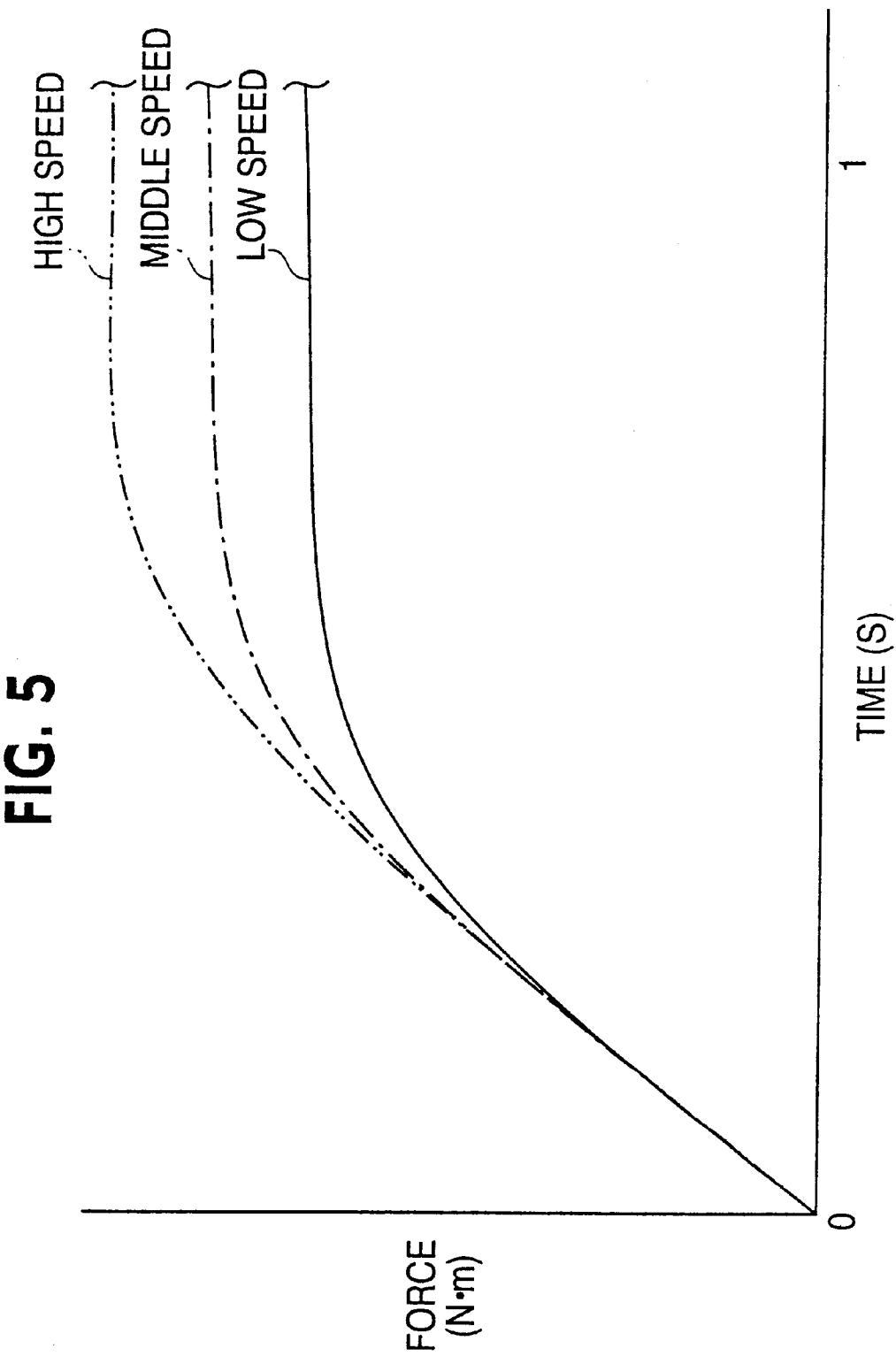
FIG. 5 is a graph schematically showing the relation between the rotational resistance force F [Nm] (Newton meter) of the short-circuited DC motor and time T [sec] (second) from a point where a vehicle collides with a wall (0 point in this figure) to a point where the vehicle completely crashes. Curves indicate cases which are different in the collision speed (Low, Middle, High) of the vehicle, respectively.

FIG. 5 is a graph schematically showing the relation between the rotational resistance force F [Nm] (Newton meter) of the short-circuited DC motor and time T [sec] (second) from a point where a vehicle collides with a wall (0 point of this graph) to a point where the vehicle completely crashes or comes to rest. Curves indicate cases which are different in the collision speed (Low, Middle, High) of the vehicle, respectively.

As shown in FIG. 4, in the case of a light-weight occupant, the rising slope or inclination of the curve is relatively gentle (the solid line in the graph of FIG. 4). In the case of a heavy-weight occupant, the rising inclination of the curve is steep (the two-dot chain line shown in FIG. 4). In the case of a medium-weight occupant, the rising inclination of the curve is middle between the case of the light-weight occupant and the case of the heavy-weight occupant. Regardless of the occupant's weight, the descending slope or inclination of all of the cases are gentle.

Accordingly, by using the rotational resistance force as the EA mechanism, EA load is relatively gently increased against the light-weight occupant so that the total load on the light-weight occupant is relatively small. On the other hand, EA load is relatively steeply increased against the heavy-weight occupant so that the total load on the heavy-weight occupant is relatively large. The decrease in EA load is gentle regardless of the occupant's weight, such that the belt tension on the occupant is reduced at a slow rate as the lapse of time, that is, a soft landing can be achieved.

As shown in FIG. 5, the higher the speed of the vehicle when colliding with a wall, the higher the load limit of the rotational resistance force F (EA load limit) (the two-dot chain line in the graph of FIG. 5). The lower the speed of the vehicle when colliding with a wall, the lower the load limit of the rotational resistance force F (the solid line in the graph of FIG. 5). That is, the load limit is increased or decreased depending on the collision speed, exhibiting the ideal occupant restraint performance.

In case of conventional mechanical EA mechanism (e.g. a torsion bar) the rising inclination of EA load is constant so that the load limit is also constant regardless of the occupant's weight and the collision speed. The present invention improves on conventional methods and devices.

The load limit can be freely set in various manners as follows. For example, the gear ratio of the gears located between the shaft of the DC motor 21 and the web spool 38 may be changed. A change in gear ratio changes the load limit of the rotational resistance force transmitted from the motor 21 to the spool 38. Also, a change in gear ratio changes the rising and descending slope of the force over time shown in FIG. 4.

Figure 9A:
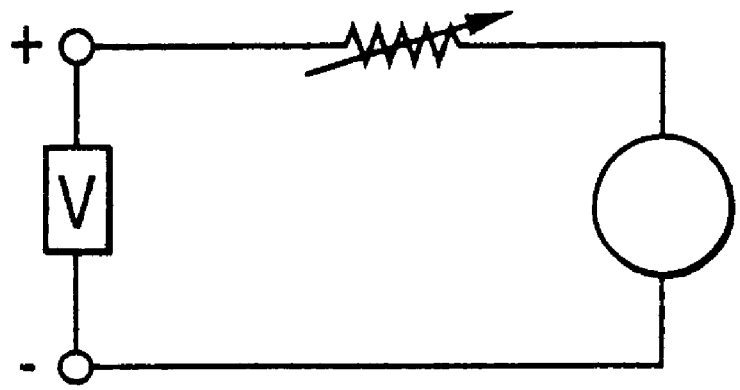
FIG. 9a is a circuit diagram of the circuit including the retractor dc motor and a variable resistor.

Further by way of example, the DC motor 21 may be attached to a circuit that includes a variable resistor 40, as shown in FIG. 9a. The value of the resistor 40 may be changed in order to change the load limit of the force being transferred from the motor to the web spool 38. Similarly, the value of resistance may be changed to adjust the rising inclination and the descending inclination of the curves shown in FIG. 4. As the value of resistance is increased, the amount of force transferred from the motor 21 to the web spool 38 decreases. As a result, the load limit decreases, the rising inclination becomes gentler, and the descending inclination becomes steeper. In this case, a plurality of resistors having different values of resistance may be positioned in parallel and selectably connected to the circuit in such a manner as to automatically connect to a resistor having a value best suited to achieve ideal restraint performance.

Figure 9B:
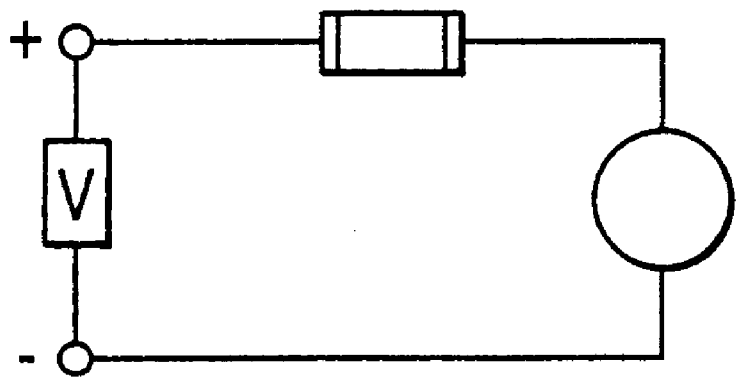
FIG. 9b is a circuit diagram of the circuit including the retractor dc motor and a fuse.

Still further by way of example, a fuse 42 may be connected to the power supply for the motor 21, as shown in FIG. 9b. The EA mechanism provided by the motor 21 can be released by opening the fuse and open-circuiting the motor to lower the EA load when current exceeds a predetermined value.

As described above, the DC motor 21 may be energized by a driving current to rotate in a direction for retracting the webbing W (the direction of arrow in FIG. 3(A)). Rotation in this direction provides a rotational resistance force opposite to the force provided by the occupant. On the contrary, the rotational shaft of the DC motor 21 may be rotated in the direction of withdrawing the webbing W (the direction opposite to the direction of arrow in FIG. 3(A)), to provide a force that subtracts from the conventional rotational resistance force.

Alternatively, the motor 21 may be replaced with another one having different output. Thus, the load limit of the rotational resistance force F, the rising inclination, and the descending inclination can be adjusted by changing the motor rating. When plus assist load can be added such a manner as to cancel the rotational torque of the spool acting in a direction of withdrawing the seat belt, the function of a locking mechanism can be achieved.

As shown in FIG. 10, the time period t1 of short circuit of the DC motor 21 and the time period t2 of non-short circuit of the DC motor 21 may be freely changed to make a pulse-like rectangular wave in order to adjust the load limit of the rotational resistance force F, the rising inclination, and the descending inclination of the resistance force. For instance, as the time period t1 is set longer than the time period t2, the load limit becomes higher, the rising inclination becomes steeper, and the descending inclination becomes gentler. On the contrary, as the time period t2 is set longer than the time period t1, the load limit becomes lower, the rising inclination becomes gentler, and the descending inclination becomes steeper.

The timing for starting the EA mechanism can be controlled by an ECU ("Electronic Control Unit") for commanding the ignition timing of an airbag device or an ECU for a pretension mechanism.

It is preferable that the load limit of the rotational resistance force F, the rising inclination, and the descending inclination are suitably set according to the withdrawal characteristic of webbing W which is obtained from experiments using real cars with dummies.

A rotational shaft with a magnet in a copper tube may be used instead of the DC motor 21, thereby removing the requirement to energize the motor and, thus, making EA mechanism at a low cost and with a simple structure.

Combinations of the EA mechanism and various pretension mechanisms such as a back pretensioner may provide more advantages. Further, a vehicle sensor may be incorporated in the retractor as an EA switch.

The method of using the rotational resistance force of the short-circuited motor as EA mechanism according to the present invention can be applied to a retractor of another type just like the aforementioned embodiment shown in FIG. 1.

Hereinafter, description will now be made as regard to a retractor according to the present invention and its operational flow.

The retractor 400 according to this embodiment is a novel motorized retractor 400 in which the EA mechanism as described above is applied to a motorized retractor 400 to cope with the event of plural collisions, i.e. when the initial collision is serially followed by a secondary collision. Particularly, the description will be made as regard to a control system of the motorized retractor 400.

Figure 6:
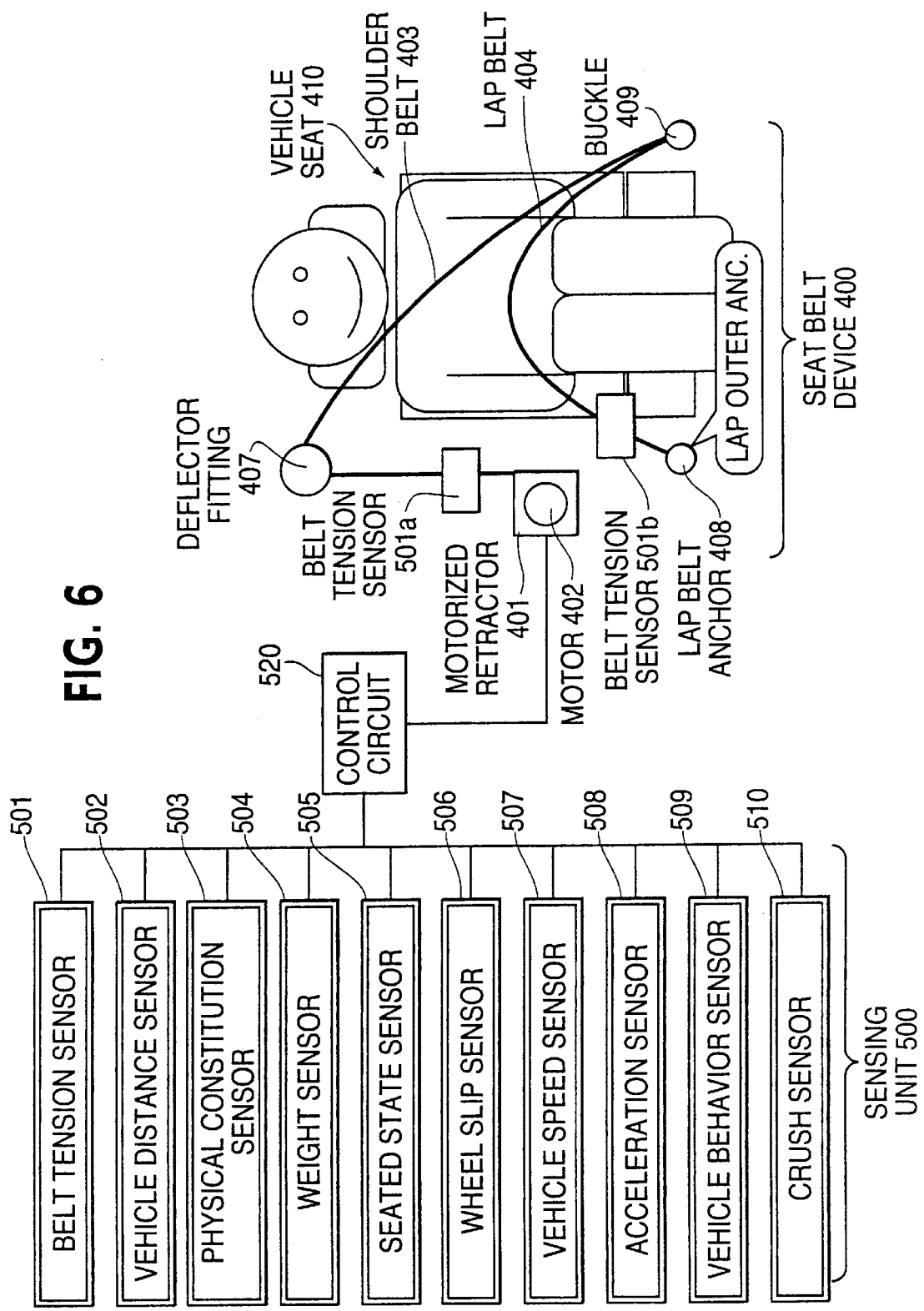
FIG. 6 is a view schematically illustrating a control system of a motorized retractor according to the present invention.

FIG. 6 is a view schematically illustrating the control system of the motorized retractor 400 according to the present invention. FIG. 7 is a flow chart of the control system. FIG. 8 is a view showing the operative state in time sequence for restraining an occupant by the motorized retractor employing this control system.

As shown in FIG. 6, the control system includes a sensing unit 500 for detecting the state of an occupant and the state of the vehicle. The control system controls the operation of a seat belt device 400. A control circuit 520 is operatively connected to the sensing unit 500. The control circuit 520 judges the state of the occupant and the state of the vehicle according to signals outputted from the sensing unit 500. The control circuit 520 outputs control signals to a motor 402 for a retractor 401. The control signals are required to cause the retractor 401 to take a safe and suitable action. The seat belt device 400 includes a motorized retractor 401 wherein the motorized retractor 401 has the motor 402 provided with an emergency locking mechanism which is actuated by the receipt of the control signal from the control circuit 520. A pretensioner mechanism is provided. The pretensioner mechanism is actuated by the receipt of the control signal from the control circuit 520. An EA mechanism is also provided. The EA mechanism is actuated by the control signal from the control circuit 520.

Preferably, the collision predictive device may include the following sensors: a vehicle distance sensor, a vehicle speed sensor, an acceleration sensor, and a vehicle behavior sensor. The collision predictive device is not limited to those sensors, but may include other sensors well known to one of ordinary skill in the art. In addition, sensors may be used that detect not only an imminent collision, but also a vehicle's behavior during the collision.

The seat belt device 400 further includes a shoulder belt 403 for restraining mainly a portion from the shoulder to the chest of the occupant and a lap belt 404 for restraining mainly a portion about the hip of the occupant. A belt tension sensor 501a is provided for obtaining the belt tension of the shoulder belt 403. In addition, the sensing unit includes a belt tension sensor 501b for obtaining the belt tension of the lap belt 404. The device 400 includes a deflector fitting 407 slidably supporting the shoulder belt 403, a lap belt anchor 408 supporting one end of the lap belt 404, and a buckle 409 slidably supporting the lap belt 404. As shown in FIG. 6, the occupant is seated on a vehicle seat 410.

As mentioned above, the sensing unit 500 includes the belt tension sensors 501a, 501b for detecting the tension of the shoulder belt 403 and the lap belt 404. The unit also includes a vehicle distance sensor 502 for measuring the distance between the subject vehicle and another vehicle, a physical constitution sensor 503 for detecting the physical constitution of the occupant, a weight sensor 504 for detecting the weight of the occupant, a seated state sensor 505 for detecting the state of the occupant sitting on the vehicle seat, a wheel slip sensor 506 for detecting the slipping state of wheels of the vehicle during running, a vehicle speed sensor 507 for detecting the speed of the vehicle during running, an acceleration sensor 508 for detecting the acceleration and deceleration of the vehicle during running, a vehicle behavior sensor 509 for detecting the behavior of the vehicle during running, for example, spinning, drift, and roll-over of the vehicle, and a crush sensor 510 for detecting the colliding state. Signals from these sensors of the sensing unit 500 are received by the control circuit 520 where the signals are compared with reference values previously stored in a storage unit (not shown) to diagnose the condition of the occupant and the condition of the vehicle. Based on the diagnosis, the control circuit 520 outputs a control signal to the motor 402. According to the control signal, the motor 402 drives the motorized retractor 401 such that the emergency locking mechanism, the pretensioner mechanism, and/or the EA mechanism are actuated.

The EA mechanism is structured by the technique as described above. The description of the detailed structure of the EA mechanism will be omitted in order to avoid repetition.

The pretensioner mechanism is provided so that when the control circuit 520 determines that the occupant and the vehicle are in dangerous state or condition based on information about the conditions of the occupant and the vehicle sent from the aforementioned respective sensors, the control circuit 520 outputs a signal and the slack of the seat belt is removed by winding up the seat belt with a motor prior to the collision, thus securely restraining the occupant. The term "dangerous state" means that there is a possibility of a vehicle collision or that the driver is not able to control the vehicle due to wheel slip or the like.

Even after the vehicle collision, it is possible to restrain the occupant by advancing the timing of the control circuit 520 and outputting a signal for winding up the seat belt.

The emergency locking mechanism is actuated when the control circuit 520 receives signals from the respective sensors of the sensing unit 500 and determines, based on the signal, that the occupant and the vehicle are in danger. The emergency locking mechanism may include a locking mechanism for preventing the seat belt from being withdrawn by imparting rotational torque to the rotational shaft of a motor. Alternatively, the emergency locking mechanism may include a locking mechanism for preventing the seat belt from being withdrawn by generating rotational resistance force against the rotation of the rotational shaft of a motor which is short-circuited.

Description will now be made as regard to the operation of the control system of the present invention with reference to FIG. 7 and FIG. 8.

Figure 8A:
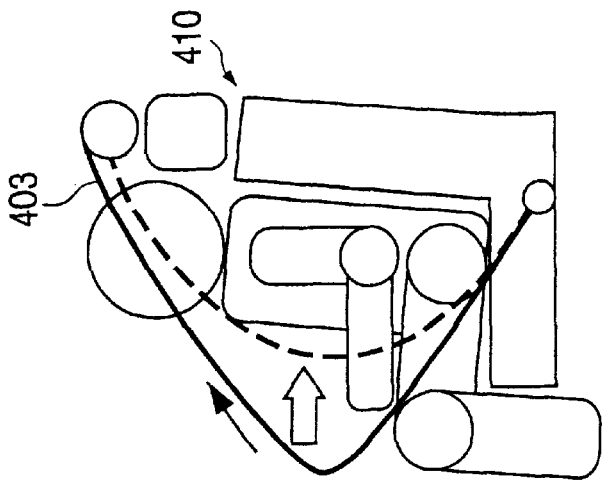
FIG. 8 is a view showing the operative state in time sequence for restraining an occupant by the motorized retractor employing the control system.

As shown in FIG. 7, when there is a high possibility of a vehicle collision (i.e., a dangerous state), the sensors of the sensing unit 500 outputs signals to the control circuit 520 (S1). The control circuit 520 receives the signals from the sensing unit 500 and compares the information on the signals to the reference values which are previously stored. Based on the results of the comparisons, the control circuit 520 outputs a predetermined drive signal to the motor 402 of the motorized retractor 401. The predetermined drive signal causes the motorized retractor 401 to conduct the pretensioner action (S2). By the pretensioner action, the occupant is strongly held to the vehicle seat 410, thereby ensuring the initial restraint (S3 FIG. 7; FIG. 8(A)).

In Step S4, when no collision has occurred (No), the sequence proceeds to Step S10. When the dangerous state is still not avoided (No), the sequence returns to Step S4. When the dangerous state is avoided (Yes), the motorized seat belt retractor 401 is driven to release the winding force after slightly strongly winding up the seat belt. This action is done at least once. This action enables to release so-called end lock (the state that the locked state of a locking mechanism is not cancelled even after the dangerous state is avoided) of the belts 403, 404. In this manner, the occupant can be released from the restraint by the seat belt (S11). This action is referred to as "end lock releasing action".

Figure 8B:
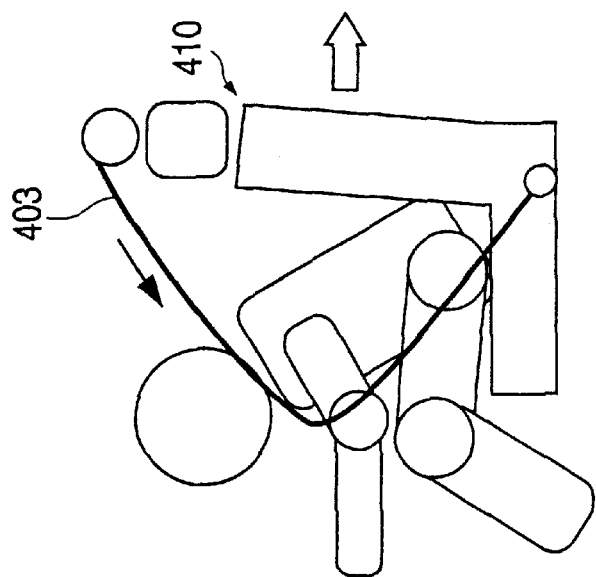
Figure 8C:
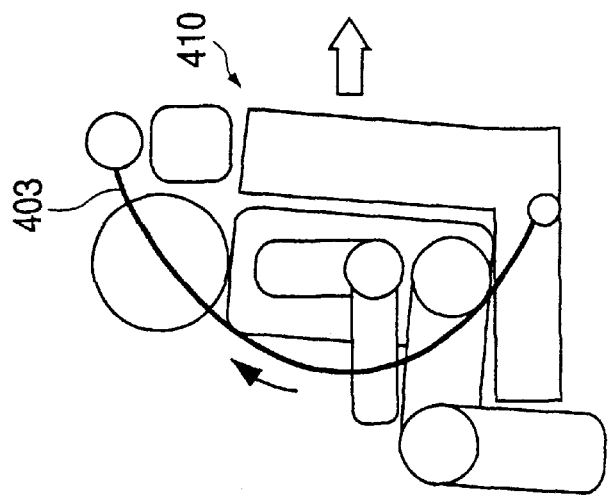

On the other hand, in Step S4, when a collision is occurred (Yes), the sequence proceeds to Step S5. Although the belts 403, 404 are subjected to the force caused by inertial forward movement of the occupant, the belts 403, 404 are not withdrawn from the motorized seat belt retractor 401. However, the EA mechanism is activated as mentioned above in which the rotational resistance force caused by the rotation of the rotational shaft of the short-circuited motor 402 is used as the EA mechanism, or in which the rotational resistance force caused by suitably applying rotational torque in a direction opposite to the rotational direction of the rotational shaft wherein the rotational direction is equal to the belt-withdrawing direction (FIG. 7 S5; FIG. 8(B)). Due to the action of the EA mechanism, the occupant moves forward with the load applied by the belts 403, 404 being maintained not to exceed a predetermined upper limit (load upper limit). The belt tension on the occupant is reduced at a slow rate as the lapse of time, thereby absorbing the impact on the occupant and achieving the soft landing (S6, FIG. 8(B)). As the impact on the occupant is removed, the seat belt is wound up by the motorized seat belt retractor 401 again (S7, FIG. 8(C)). Therefore, the occupant is pulled and returned to the original seated position (S8, FIG. 8C). In this manner, the occupant is restrained in the vehicle seat again (S9, FIG. 8(C)).

Then, in Step S10, when the dangerous state is avoided (Yes), the motorized seat belt retractor 401 releases the occupant from the restraint by the seat belt after taking the end lock releasing action (S11).

When the dangerous state is not avoided after the first collision in Step S10 (No in S10) and a second collision is occurred (Yes in S4), the belts 403, 404 are not withdrawn from the motorized seat belt retractor 401 due to the force caused by the inertial forward movement of the occupant, because the seat belt is locked by the retractor. During this, the belt tension sensors 501a, 501b detect increase in the belt tension and thus outputs a signal to the control circuit 520. As the value of this signal exceeds the threshold, the EA mechanism is activated employing means just as mentioned above in which the rotational resistance force caused by the rotation of the rotational shaft of the short-circuited motor 402 is used as the EA mechanism, or employing means in which the rotational resistance force caused by suitably applying rotational torque in a direction opposite to the rotational direction of the rotational shaft wherein the rotational direction is equal to the belt-withdrawing direction (S5, FIG. 8(B)). By the action of the EA mechanism, the occupant moves forward with the load applied by the belts

403, 404 being maintained not to exceed a predetermined upper limit (load upper limit). The belt tension on the occupant is reduced at a slow rate as the lapse of time, thereby absorbing the impact on the occupant and achieving the soft landing (S6, FIG. 8(B)). As the impact on the occupant is removed, the belt tension is lowered so that the value of the signal from the belt tension sensors 501a, 501b is lowered below the threshold. This state is used as a trigger for actuating the motorized seat belt retractor 401 so that the belts 403, 404 are wound up by the motorized seat belt retractor 401 again (S7, FIG. 8(C)). Therefore, the occupant is pulled and returned to the original seated position (S8, FIG. 8C). In this manner, the occupant is restrained in the vehicle seat again (S9, FIG. 8(C)).

Then in Step S10, when the dangerous state is not avoided even after the second collision (No in S10), the sequence is returned to Step S4. On the other hand, when the dangerous state is avoided after the second collision (Yes in S10), the restraint of the occupant is released (S11).

When another collision is occurred even after it is judged that the dangerous state is avoided (Yes in S10), the similar restraint of the occupant can be achieved starting from Step S1.

According to the control system as mentioned above, a series of actions from S1 to S11 can be repeated as long as another collision is occurred. Therefore, the control system is extremely effective means of safely protecting the occupant from plural collisions.

The physical constitution sensor 503 and the weight sensor 504 may be employed for selecting suitable EA load corresponding to the physical constitution and the weight of the occupant. Further, the seated state sensor 505 may cooperate with the physical constitution sensor 503 and the weight sensor 504 to detect that, for example, the occupant has a small body and is positioned out of the suitable position (i.e., "out-of-position") so as to select further suitable EA load. For instance, when a driver is positioned too far forward (i.e., too close to a steering wheel), the system enables to select a suitable EA load to prevent the occupant from colliding with the steering wheel.

Further, the wheel slip sensor 506 and the vehicle behavior sensor 509 may be employed for actuating the pretensioner mechanism to press and hold the occupant to the vehicle seat in early stage, thus achieving the early restraint, in case of slipping spinning, drift, and/or roll-over of the vehicle.

Furthermore, the vehicle distance sensor 502 and the vehicle speed sensor 507 may be employed for predicting possibility of collision including vehicle-to-vehicle collision, vehicle-to-object collision, and vehicle-to-person collision, thus achieving the early actuation of the pretensioner mechanism.

As discussed above, the present invention achieves suitable timing of locking of the locking mechanism.

Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims and equivalents thereof.

What is claimed is:

1. A motorized seat belt retractor configured to be activated in response to a signal generated by a dangerous state detection device indicating that a vehicle is in a dangerous state, the retractor being configured so that in response to the signal the retractor operates to retract a seat belt webbing prior to a collision thereby restraining an occupant positioned in a seat in the vehicle, wherein the retractor includes a motor for retracting the seatbelt and an energy absorbing mechanism that employs a counter electromotive force generated by the motor, and wherein the retractor is configured to be activated every time a signal indicating that the vehicle is in a dangerous state is received from the detection device.

2. The motorized seat belt retractor of claim 1, wherein said retractor is configured to release the restraint of the occupant when the detection device determines that the vehicle is no longer in a dangerous state.

3. The motorized seat belt retractor of claim 1, wherein said retractor is configured to release the restraint of the occupant when the signal indicating the existence of the dangerous state is absent for a predetermined period of time.

4. The motorized seat belt retractor of claim 1, wherein said dangerous state detection device includes a collision predictive device.

5. The motorized seat belt retractor of claim 1, wherein said dangerous state detection device includes a seated state sensor.

6. A system for protecting a passenger seated in a vehicle seat comprising:
   a sensing unit configured to provide a signal indicating that a collision is imminent;
   a control circuit operatively connected to the sensing unit;
   a seat belt device having a seat belt retractor; wherein the retractor is configured to retract a webbing of a seat belt when a control signal from the control circuit is received; and
   an energy absorbing mechanism for limiting the load on the passenger,
wherein the retractor is adapted to maintain the webbing in a retracted state until the sensing unit determines that the collision is no longer imminent, wherein the energy absorbing mechanism is configured to allow the webbing to withdraw from the retractor during the collision, and wherein the retractor is adapted to retract the webbing following the collision to return the passenger to a normal position.

7. The system of claim 6 wherein the retractor includes a motor for retracting the webbing.

8. The system of claim 6, wherein the energy absorbing mechanism is adapted to limit the load on the passenger.

9. The system of claim 6, wherein the retractor is adapted to maintain the webbing in the retracted state following the occurrence of the collision.

* * * * *